United States Patent
Ram et al.

(10) Patent No.: US 9,025,581 B2
(45) Date of Patent: May 5, 2015

(54) HYBRID VIRTUAL CELL AND VIRTUAL PORT WIRELESS NETWORK ARCHITECTURE

(71) Applicant: Meru Networks, Sunnyvale, CA (US)

(72) Inventors: Mohan Ram, Bangalore (IN); Sung-Wook Han, Sunnyvale, CA (US); Brett Schavey, Frankton, CO (US); Ajay Kunnath, Bangalore (IN); Rishikesh Basu, Bangalore (IN); Berend Dunsbergen, San Jose, CA (US); Vaduvur Bharghavan, Morgan Hill, CA (US); Joseph Epstein, Pleasanton, CA (US)

(73) Assignee: Meru Networks, Sunnyvale, CA (US)

( * ) Notice: Subject to any disclaimer, the term of this patent is extended or adjusted under 35 U.S.C. 154(b) by 271 days.

(21) Appl. No.: 13/763,639

(22) Filed: Feb. 9, 2013

(65) Prior Publication Data

US 2013/0148609 A1 Jun. 13, 2013

Related U.S. Application Data

(63) Continuation-in-part of application No. 12/913,584, filed on Oct. 27, 2010, now Pat. No. 8,787,309, which is a continuation of application No. 11/715,287, filed on Mar. 7, 2007, now Pat. No. 7,826,426, and a (Continued)

(51) Int. Cl.
*H04W 4/00* (2009.01)
*H04W 72/04* (2009.01)
*H04W 24/02* (2009.01)

(52) U.S. Cl.
CPC .......... *H04W 72/0433* (2013.01); *H04W 24/02* (2013.01)

(58) Field of Classification Search
None
See application file for complete search history.

(56) References Cited

U.S. PATENT DOCUMENTS

| | | |
|---|---|---|
| 3,956,749 A | 5/1976 | Magorian |
| 5,038,151 A | 8/1991 | Kaminski |
| 5,125,108 A | 6/1992 | Talwar |
| 5,177,788 A | 1/1993 | Schanning et al. |
| 5,337,397 A | 8/1994 | Lebby et al. |
| 5,519,706 A | 5/1996 | Bantz et al. |

(Continued)

FOREIGN PATENT DOCUMENTS

| | | |
|---|---|---|
| JP | 2005311580 | 11/2005 |
| JP | 2006229972 | 8/2006 |

OTHER PUBLICATIONS

Amir. "Fast Handoff for Seamless Wireless Mesh Networks." MobiSys '06, Jun. 19-22, 2006, pp. 83-95, ACM, Uppsala, Sweden.

(Continued)

*Primary Examiner* — Bob Phunkulh
(74) *Attorney, Agent, or Firm* — Law Office of Dorian Cartwright

(57) ABSTRACT

A controller directing access points to default to a virtual cell service mode which allows seamless mobility for stations in motion around a wireless network is disclosed. Responsive to identifying a first station, the controller logic may dictate tighter controls for the first station by selecting a virtual port service mode. Some embodiments can also select a native cell service mode for devices due to a connection history of the station or a MAC OUI that is incompatible with virtual cell service mode. An initial service mode can be changed due to a condition. Also, the controller provides multiple BSSIDs to each access point.

14 Claims, 7 Drawing Sheets

Related U.S. Application Data continuation of application No. 11/298,864, filed on Dec. 9, 2005, now abandoned, and a continuation-in-part of application No. 11/294,673, filed on Dec. 5, 2005, now Pat. No. 8,160,664, which is a continuation of application No. 11/298,864, filed on Dec. 9, 2005, and a continuation-in-part of application No. 11/294,673, filed on Dec. 5, 2005, now Pat. No. 8,160,664.

(56) References Cited

U.S. PATENT DOCUMENTS

| | | |
|---|---|---|
| 5,884,272 A | 3/1999 | Walker et al. |
| 5,966,094 A | 10/1999 | Ward et al. |
| 6,023,621 A | 2/2000 | Jackson et al. |
| 6,658,047 B1 | 12/2003 | Komulainen et al. |
| 6,728,603 B2 | 4/2004 | Pruzan et al. |
| 6,760,318 B1 | 7/2004 | Bims |
| 6,788,658 B1 | 9/2004 | Bims |
| 6,839,038 B2 | 1/2005 | Weinstein |
| 6,877,043 B2 | 4/2005 | Mallory et al. |
| 6,894,649 B2 | 5/2005 | Ostervall |
| 6,933,909 B2 | 8/2005 | Theobold |
| 6,950,629 B2 | 9/2005 | Nagy |
| 6,954,177 B2 | 10/2005 | Channabassapa et al. |
| 6,978,158 B2 | 12/2005 | Ghavami |
| 6,999,802 B2 | 2/2006 | Kim |
| 7,171,215 B2 | 1/2007 | Khouaja et al. |
| 7,194,008 B2 | 3/2007 | Chu et al. |
| 7,197,308 B2 | 3/2007 | Singhal et al. |
| 7,277,728 B1 | 10/2007 | Kauhanen |
| 7,319,685 B2 | 1/2008 | Kim et al. |
| 7,333,455 B1 | 2/2008 | Bolt et al. |
| 7,359,362 B2 | 4/2008 | King et al. |
| 7,400,604 B2 | 7/2008 | Lee et al. |
| 7,403,506 B2 | 7/2008 | Lee et al. |
| 7,406,319 B2 | 7/2008 | Kostic et al. |
| 7,420,942 B2 | 9/2008 | Wang |
| 7,426,388 B1 | 9/2008 | Wright et al. |
| 7,430,397 B2 | 9/2008 | Suda et al. |
| 7,433,722 B2 | 10/2008 | Sakamoto et al. |
| 7,466,981 B1 | 12/2008 | Abdelmahid et al. |
| 7,515,909 B2 | 4/2009 | Jain et al. |
| 7,555,287 B1 | 6/2009 | Heinonen et al. |
| 7,630,402 B2 | 12/2009 | Un et al. |
| 7,693,513 B2 | 4/2010 | Chou |
| 7,826,426 B1 | 11/2010 | Bharghavan et al. |
| 7,843,910 B2 | 11/2010 | Loughran et al. |
| 8,027,637 B1 | 9/2011 | Bims |
| 8,090,374 B2 | 1/2012 | Rezvani et al. |
| 8,787,309 B1 | 7/2014 | Bharghavan et al. |
| 2002/0022483 A1* | 2/2002 | Thompson et al. ............ 455/439 |
| 2002/0060995 A1 | 5/2002 | Cervello et al. |
| 2002/0086640 A1 | 7/2002 | Belcher et al. |
| 2002/0112008 A1 | 8/2002 | Christenson et al. |
| 2002/0147031 A1 | 10/2002 | Hood |
| 2002/0181629 A1 | 12/2002 | Shibata |
| 2003/0162546 A1 | 8/2003 | Jordan |
| 2003/0198305 A1 | 10/2003 | Taylor et al. |
| 2003/0199247 A1 | 10/2003 | Striemer |
| 2003/0206532 A1 | 11/2003 | Shpak |
| 2003/0206535 A1 | 11/2003 | Shpak |
| 2003/0207697 A1 | 11/2003 | Shpak |
| 2003/0207698 A1 | 11/2003 | Shpak |
| 2003/0207699 A1 | 11/2003 | Shpak |
| 2003/0236103 A1 | 12/2003 | Tamaki et al. |
| 2004/0051668 A1 | 3/2004 | Chang |
| 2004/0063455 A1 | 4/2004 | Eran et al. |
| 2004/0121770 A1 | 6/2004 | Tigerstedt et al. |
| 2004/0141617 A1 | 7/2004 | Volpano |
| 2004/0156399 A1 | 8/2004 | Eran |
| 2004/0183726 A1 | 9/2004 | Theobold |
| 2004/0185904 A1 | 9/2004 | Yamakita |
| 2004/0235453 A1 | 11/2004 | Chen et al. |
| 2005/0054370 A1 | 3/2005 | Shpak |
| 2005/0111405 A1 | 5/2005 | Kanterakis |
| 2005/0122919 A1 | 6/2005 | Touag |
| 2005/0135321 A1 | 6/2005 | Sharony |
| 2005/0152314 A1 | 7/2005 | Sun et al. |
| 2005/0153713 A1 | 7/2005 | Sharony |
| 2005/0156794 A1 | 7/2005 | Theobold et al. |
| 2005/0156799 A1 | 7/2005 | Theobold |
| 2005/0195110 A1 | 9/2005 | Lin et al. |
| 2005/0219143 A1 | 10/2005 | Schadler et al. |
| 2005/0220048 A1 | 10/2005 | Lee et al. |
| 2005/0238054 A1 | 10/2005 | Sharma |
| 2005/0261970 A1* | 11/2005 | Vucina et al. ............ 705/16 |
| 2006/0002331 A1 | 1/2006 | Bhagwat et al. |
| 2006/0025127 A1 | 2/2006 | Cromer et al. |
| 2006/0049987 A1 | 3/2006 | Herrick |
| 2006/0056443 A1 | 3/2006 | Tao et al. |
| 2006/0098613 A1 | 5/2006 | Kish et al. |
| 2006/0111112 A1 | 5/2006 | Maveddat |
| 2006/0132360 A1 | 6/2006 | Caimi et al. |
| 2006/0215691 A1 | 9/2006 | Kobayashi et al. |
| 2006/0221993 A1 | 10/2006 | Liao et al. |
| 2006/0281500 A1 | 12/2006 | Huang et al. |
| 2007/0014267 A1 | 1/2007 | Lam et al. |
| 2007/0026807 A1* | 2/2007 | Kish ............ 455/63.4 |
| 2007/0117514 A1 | 5/2007 | Gainey et al. |
| 2007/0165610 A1 | 7/2007 | Tseng et al. |
| 2007/0195725 A1* | 8/2007 | Iino et al. ............ 370/328 |
| 2007/0213071 A1 | 9/2007 | Hwang |
| 2008/0014956 A1 | 1/2008 | Balasubramanian |
| 2008/0102835 A1 | 5/2008 | Zhao et al. |
| 2008/0112373 A1 | 5/2008 | Shpak |
| 2008/0153497 A1 | 6/2008 | Kalhan |
| 2008/0165866 A1 | 7/2008 | Teo et al. |
| 2008/0167093 A1 | 7/2008 | Nagano et al. |
| 2008/0212535 A1 | 9/2008 | Karaoguz et al. |
| 2008/0242305 A1 | 10/2008 | Kahlert et al. |
| 2008/0287130 A1 | 11/2008 | Laroia et al. |
| 2009/0022127 A1 | 1/2009 | Traynor et al. |
| 2009/0023434 A1 | 1/2009 | Trainor et al. |
| 2009/0061873 A1 | 3/2009 | Bao et al. |
| 2009/0061879 A9 | 3/2009 | Gallagher et al. |
| 2009/0111472 A1 | 4/2009 | Promenzio |
| 2009/0252165 A1* | 10/2009 | Zhang et al. ............ 370/390 |
| 2010/0080151 A1 | 4/2010 | Proctor et al. |
| 2011/0040969 A1* | 2/2011 | Yao et al. ............ 713/168 |
| 2011/0188484 A1* | 8/2011 | Reznik et al. ............ 370/338 |
| 2011/0305217 A1 | 12/2011 | Seok |
| 2012/0307792 A1* | 12/2012 | Ram et al. ............ 370/331 |
| 2012/0314696 A1* | 12/2012 | Liu ............ 370/338 |
| 2012/0317619 A1* | 12/2012 | Dattagupta et al. ............ 726/4 |
| 2013/0188539 A1* | 7/2013 | Han et al. ............ 370/310 |
| 2014/0112322 A1* | 4/2014 | Ram et al. ............ 370/338 |
| 2014/0126466 A1* | 5/2014 | Hamdi et al. ............ 370/328 |

OTHER PUBLICATIONS

Business Wire. "Meru Networks Delivers Industry's Only Zero-Loss Mobility Across WLAN Access Points and IP Subnets." Jun. 21, 2004, pp. 1-2.

Chen et al. "A Seamless Handoff Mechanism for OHCP-Based IEEE 802.11 WLANs." IEEE Communications Letters, Aug. 2007, pp. 665-667, vol. 1, No. 8.

Cheung et al. "Network Configurations for Seamless Support of COMA Soft Handoffs Between Cell Clusters." IEEE Journal on Selected Areas in Communications, Sep. 1997, pp. 1276-1278, vol. 15, No. 7.

Chou et al. "Intelligent Agent Over WLAN With Seamless Handover and Load Balancing." 2006 International Conference on Communication Technology, Nov. 27-Nov. 30, 2006, pp. 1-7, IEEE. (Abstract).

Chui et al. "An Access Point Coordination System for Improved VoIP/WLAN Handover Performance." IEEE, 2006, pp. 501-505.

Fan et al. "Managing Heterogeneous Access Networks." 32nd IEEE Conference on Local Computer Networks, 2007, pp. 651-658, IEEE 2007, pp. 651-658.

Finneran. "Can WLAN switches support voice? Today's controllers offer key security and QoS capabilities, but as always, the devil's in the details." Business Communications Review, Oct. 2006, pp. 42-47.

(56) References Cited

OTHER PUBLICATIONS

Habib et al. "Multi-antenna techniques for OFDM based WLAN." Proceedings of First International Conference on Next-Generation Wireless Systems, Jan. 2006, pp. 186-190.

Huang et al. "Incorporating AP Selection and Call Admission Control for Seamless Handoff Procedure." Proceedings of the International Conference on Computer and Communication Engineering 2008, pp. 823-826.

Huang et al. "SAP: Seamless Authentication Protocol for Vertical Handoff in Heterogeneous Wireless Networks." Third International Conference in Heterogeneous Wired/Wireless Networks, Aug. 7-9, 2006, pp. 1-10, Waterloo, ON, CA.

Hur et al. "A Distributed-Request-Based Diffserv CAC for Seamless Fast-Handoff in Mobile Internet." J. Sole-Pareta et al. (Eds.): Q of IS 2004: International Workshop on Quality of Future Internet Services, LNCS 3266, pp. 184-193, 2004.

IEEE Std 802. Nov. 1997 Information Technology—telecommunications and Information exchange between systems—Local and Metropolitan Area Networks—specific Requirements—part 11: Wireless LAN Medium Access Control (MAC) and Physical Layer (PHY) Specifications, IEEE Std 802.11-1997, vol., no., pp. i-445, Nov. 18, 1997.

IEEE. "Part 11: Wireless LAN Medium Access Control (MAC) and Physical Layer (PHY) specifications." IEEE Std. 802.11, 1999 Edition (R2003), 2003, vol. no. pp. i-513.

Jang et al. "Mobility Support Algorithm Based on Wireless 802.11 b LAN for Fast Handover." 5th International Conference, PDCAT 2004, Dec. 8-10, 2004, pp. 715-718, Springer Verlag. (Abstract).

Zhou et al. "A Seamless Handoff Scheme for Mobile IP." 2006 IEEE 63rd Vehicular Technology Conference, VTC 2006—Spring, May 7-Jul. 10, 2006, pp. 927-931, IEEE. (Abstract).

Kist. "Instant Handoffs for Wireless Infrastructure Meshed Networks." Proceedings of the 2008 Australasian Telecommunication Networks and Applications Conference, 2008, pp. 288-293.

Kitahara et al. "A base station adaptive antenna for downlink transmission in a OS-COMA system." IEEE 51 st Vehicular Technology Conference Proceedings, 2000 (abstract).

Liao et al. "Practical Schemes for Smooth MAC Layer Handoff in 802.11 Wireless Networks." Proceedings of the 2006 International Symposium on a World of Wireless, Mobile and Multimedia Networks. IEEE, 2006, pp. 1-10.

Lv. "Intelligent Seamless Vertical Handoff Algorithm for the Next Generation Wireless Networks." Mobilware '08, Feb. 12-15, 2008, pp. 1-10, Innsbruck, Austria.

Mahler et al. "Design and optimisation of an antenna array for WiMAX base stations." IEEE/ACES International Conference on Wireless Communications and Applied Computational Electromagnetics, 2005 (abstract).

Mannion. "Foundry Networks enters WLAN management fray—Bets on integration with wired infrastructure, market timing to take on Cisco." Electronic Engineering Times, Sep. 8, 2003, p. 32, No. 1286.

Manodham. "A Seamless Handoff Scheme with New AP Module for Wireless LANs Support VoIP." 2006. International Symposium on Applications and the Internet, SAINT 2006, Jan. 23-27 2006, pp. 253-258, IEEE. (Abstract).

Manodham et al. "A Seamless Handoff Scheme with New AP Module for Wireless LANs support VoIP." Proceedings of the 2005 Symposium on Applications and the Internet, 2006, pp. 1-6, IEEE.

Marsh. "Power and wireless options extend Ethernet's reach: Ethernet's power-delivery and wireless abilities offer new application potential that hugely extends the reach of the IEEE's 802.X series of standards." EDN, Nov. 11, 2004, p. 67, Reed Business Information.

Miaris et al. "On the base stations antenna system design for mobile communications." Electrical Engineering, 2006, vol. 88, pp. 157-163.

Miura et al. "Study of array pattern tuning method using hybrid genetic algorithms for figure-8 satellite's earth station antenna." Asia-Pacific Microwave Conference Proceedings, 2000 (abstract).

Murray et al. "Intelligent Access and Mobility Management in Heterogeneous Wireless Networks Using Policy." ACM First International Workshop on Information and Communication Technologies, 2003, pp. 181-186.

Ponnapalli et al. "Design and packaging of antennas for wireless systems." Proceedings of Electrical Performance of Electrical Packaging, 1995 (abstract).

Rist et al. "Wireless LANs—Look, Ma . . . No Wires—Wireless networking products prove they are finally ready for prime time." Internetweek, Mar. 20, 2000, p. 41, No. 805, CMP Media, Inc.

Sarolic. "Base station antenna near-field radiation pattern distortion analysis." Transactions on Engineering Sciences, 2003, pp. 1-10, vol. 41, WIT Press.

Sattari et al. "Seamless Handover Between WLAN and UMTS." 2004 IEEE 59th Vehicular Technology Conference, VTC2004—Spring: Towards a Global Wireless World, May 17-19, 2004, pp. 3035-3038, IEEE. (Abstract).

Thomsen. "Development Platform for Dynamic Bandwidth Allocation Schemes in Future MPCP Enabled Ethernet Passive Optical Network (EPON)." WSEAS Transactions on Communications, Apr. 5, 2006, pp. 92-98, WSEAS. (Abstract).

Wei et al. "Seamless Handoff Support in Wireless Mesh Networks." 2006, pp. 1-8, IEEE.

Xhafa et al. "Seamless Handover in Building Using HVAC Ducts: A New System Architecture." IEEE Global Telecommunications Conference GLOBECOM'03, Dec. 1-5, 2003, pp. 3093-3097, IEEE. (Abstract).

Yaakob et al. "An Integration of Mobile Motion Prediction with Dedicated Solicitation Message for Seamless Handoff Provisioning in High Speed Wireless Environment." 2008 International Conference on Electronic Design, Dec. 1-3, 2008, Pernang, Malaysia, pp. 1-5.

Yamagata et al. "Seamless Handover for Hotspot Network Using Adaptive Flow Control Method." 2005 Asia-Pacific Conference on Communications, Oct. 3-5, 2005, pp. 502-506, IEEE. (Abstract).

Zhou et al. A Seamless Handoff Scheme for Mobile IP. IEEE Vehicular Technology Conference, 2006, pp. 927-931, vol. 2.

* cited by examiner

HYBRID VIRTUAL CELL AND VIRTUAL PORT WIRELESS NETWORK ARCHITECTURE

CROSS-REFERENCE TO RELATED APPLICATIONS

This application claims the benefit of priority under 35 U.S.C. 120 as a continuation-in-part to co-pending and commonly-assigned U.S. application Ser. No. 12/913,584, filed Oct. 27, 2010, entitled SEAMLESS MOBILITY IN WIRELESS NETWORKS, by Vaduvur Bharghavan et al., which claims priority to U.S. application Ser. No. 11/715,287, filed Mar. 7, 2007, now U.S. Pat. No. 7,826,426, entitled SEAMLESS MOBILITY IN WIRELESS NETWORKS, by Vaduvur Bharghavan et al. and claims priority to Ser. No. 11/298,864, entitled SEAMLESS MOBILITY IN WIRELESS NETWORKS, by Vaduvur Bharghavan, now abandoned, and also claims priority to Ser. No. 11/294,673, entitled OMNI-DIRECTIONAL ANTENNA SUPPORTING SIMULTANEOUS TRANSMISSION AND RECEPTION OF MULTIPLE RADIOS WITH NARROW FREQUENCY SEPARATION, now U.S. Pat. No. 8,160,664, the contents of each being hereby incorporated by reference in their entirety.

FIELD OF THE INVENTION

The invention relates generally to computer networking, and more specifically, to a wireless network providing a combination of virtual cell and virtual port service modes.

BACKGROUND

Wireless computing technologies provide untethered access to the Internet and other networks. One of the most critical technologies for wireless networking (or Wi-Fi) is the IEEE 802.11 family of protocols promulgated by the Institute of Electrical and Electronics Engineers. Currently, the protocols are widely adopted in wireless devices such as laptop computers, tablet computers, smart phones, and network appliances.

One problem with mobile stations connected to a wireless network is the complexity of moving from a first access point to a second access point within the same wireless network. Once leaving the range of the first access point, the mobile station typically starts the connection process all over again by listening for beacon frames and requesting a new connection. Problematically, users of highly mobile devices such as smart cell phones may experience poor service due to constant reconnections while in motion.

Another problem with these wireless networks is the lack of network control over stations provided natively by wireless standards such as IEEE 802.11. More specifically, IEEE 802.11 allows a station the freedom to choose among available BSSIDs (Basic Service Set Identifiers) according to desired services. Unfortunately, unruly stations can connect to a BSSID and cause a burden or security threat to the wireless network. Conventional networks are helpless in monitoring and controlling particular stations under these standards.

Still another problem raised by multiple different stations on a wireless network is the varying services needed by different stations or users. Because state of the art access points utilize a single BSSID for all connected stations, they are unable to discriminate BSSID-based services.

What is needed is a robust technique to optimize a wireless network by providing a hybrid of virtual cell, native cell and virtual port service modes on a per-station basis.

SUMMARY

To meet the above-described needs, methods, computer program products, and systems for providing a combination of virtual cell and virtual port service modes (and optionally, native cell service mode) on a per station basis.

In one embodiment, a controller directs access points to default to a virtual cell service mode which allows seamless mobility for stations in motion around a wireless network. Responsive to identifying a first station, the controller logic may dictate tighter controls for the first station by selecting a virtual port service mode. Responsive to identifying a second station, the controller logic may conserver network resources by selecting a native cell service mode for devices. The identification can reveal, for example, a connection history of the station or an incompatible device type, used as factors for the selection of service mode.

In other embodiments, an initial service mode selection can be changed responsive to one or more conditions. For example, a station that has since become unruly has become a security threat can have tighter control imposed through a change to virtual port service mode from virtual cell or native cell service modes.

The controller provides a single access point with multiple BSSIDs (Basic Service Set Identifiers). A general BSSID can be assigned to a station in native cell service mode, while a persistent BSSID can be assigned to a station in virtual cell service mode a per-station unique BSSID can be assigned to a station in virtual port service mode.

Advantageously, a wireless network can be optimized by per-station control of network services without any modification to a station.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for providing a hybrid of virtual port and virtual cell service modes to stations connected to a wireless network are disclosed. As a result, different service modes can be provided to different stations on a wireless network. After identifying stations, the wireless network can provide a default such as virtual cell service mode to a first station while selecting to provide a more enhanced virtual port service mode to a second station. Furthermore, the wireless network can change service modes by terminating a connection and allowing the station to reconnect under the modified service mode (e.g., an unruly station).

Systems for Hybrid Services (FIGS. 1A-D)

Figure 1A:
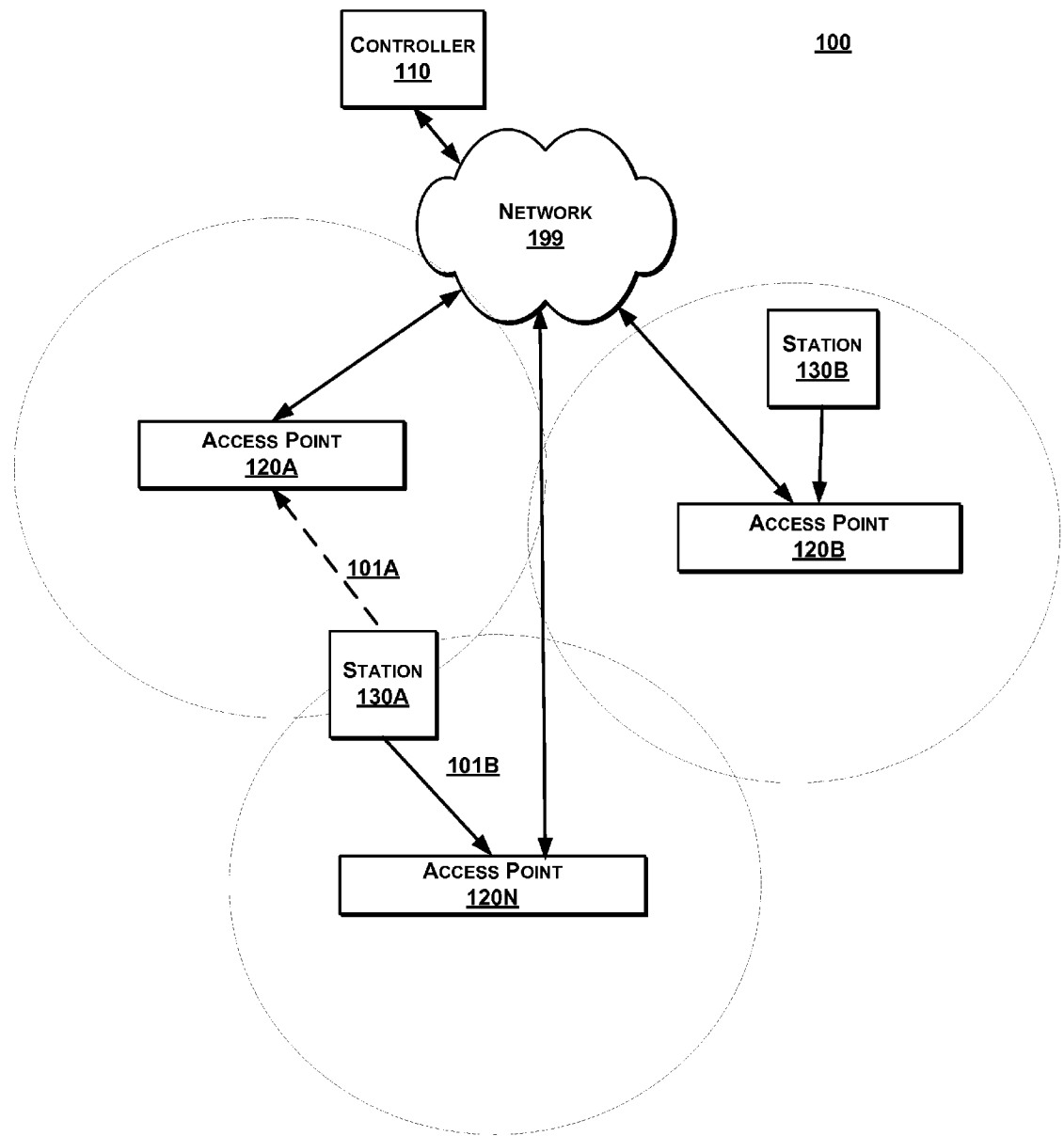
FIG. 1A is a high-level block diagram illustrating a system for providing a hybrid of virtual port and virtual cell architectures to stations connected to a wireless network, according to one embodiment.

FIG. 1A is a high-level block diagram illustrating a system 100 for providing a hybrid of virtual port and virtual cell architectures to stations connected to a wireless network, according to one embodiment. The system 100 includes a controller 110 coupled to access points 120A-N which are in turn coupled to stations 130A,B and also coupled to a network 199. At a high level, the access points 120A-N selects between a virtual cell and/or a virtual port service mode for each of the stations 130A,B, under the direction of the controller 110. In some embodiments, the wireless network also provides a native cell service mode. Other embodiments of the system 100 can include additional network components that are not shown in FIG. 1A. For example, there can be more access points, more mobile stations. There can also be switches, routers, fire walls, proxy servers, and the like.

The controller 110 (e.g., an MC1500 or MC6000 device by Meru Networks of Sunnyvale, Calif.) in the network architecture is in communication with each of multiple access points 120A-N. As a result, the controller 110 can provide a virtual cell service mode to a station within a domain by making the same BSSID (Basic Service Set Identifier) available as the station travels around the wireless network. As shown, the station 130A is initially in range of and connected to access point 120N. As the station 130A moves out of range of the access point 120N and is sensed within the range of the access point 120A, the controller 110 directs the access point 120A to respond to further communications while terminating responses from the access point 120N. This soft handoff can be invisible to the station 130A and be repeated as a user continues to move. In other words, the BSSID is persistent across different access points.

The controller 110 also provides the virtual port service mode by assigning a unique BSSID for each station in the service mode. Consequentially, the controller 110 is able to distinguish network services and network policy to an individual station. A station can benefit from virtual port service mode with service guarantees and a network can benefit with tighter controls over unknown or unruly stations at a per-station granularity. Additional details of the controller are discussed in connection with FIG. 1B.

Figure 6:
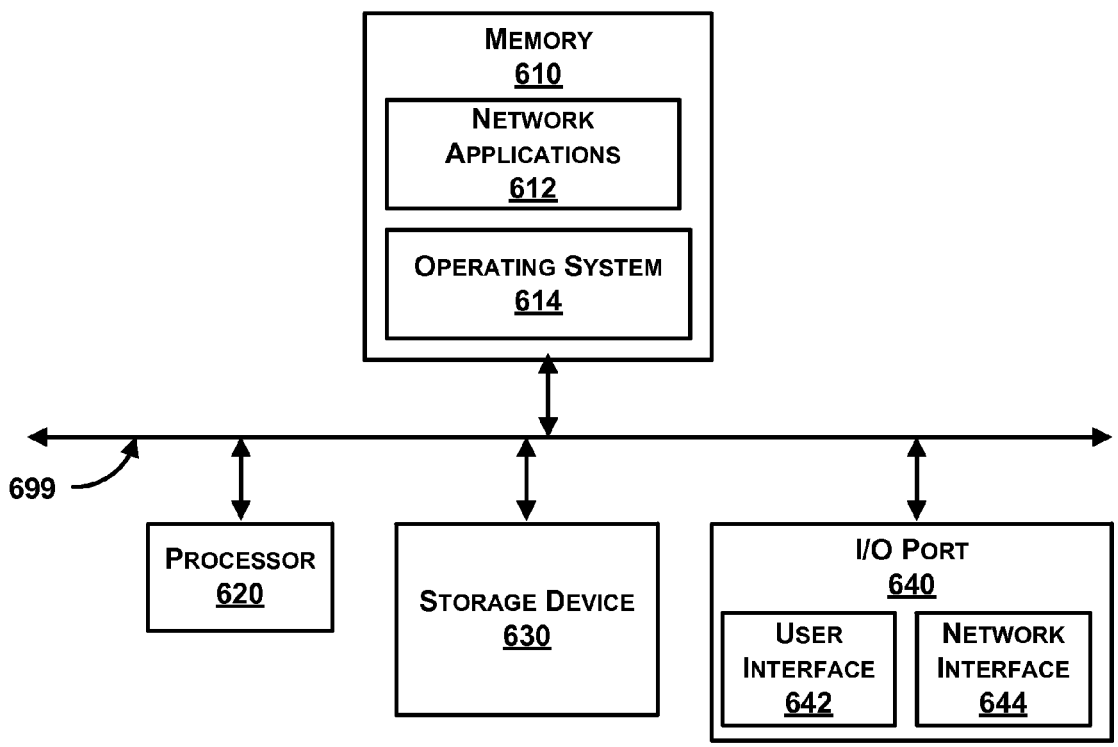
FIG. 6 is a block diagram illustrating an exemplary computing device, according to one embodiment.

The access points 120A-N can be any of the computing devices, such as a personal computer, a server blade, any computing environment as shown in FIG. 6. For example, the access points 120A-N can be an AP 110 or AP 433 (modified as discussed herein) by Meru Networks of Sunnyvale, Calif. Each access point 120A-N is preferably connected to the network 199 (or to a switch, router, hub, or another access point that is connected to the network 199) via a wired or wireless connection. The access point 120A-N can be set-up in various configurations to provide wireless coverage areas. In one embodiment, the functionality is incorporated into a switch or router, and in another embodiment, is incorporated into a custom enclosure. In operation, the access point 120A-N transmits network packets from a transmitting mobile station 120A to a receiving mobile station 120B, or transmits network packets between any components on the Internet that are in communication with mobile stations within range. In some embodiments, the access point 120A-N implement hybrid service modes, on a per station basis, as directed by the controller 110. Additional embodiments of the access point 120A-N are set forth below in FIG. 1C.

The stations 130A,B can be, for example, a personal computer, laptop computer, tablet computer, smart phone, mobile computing device, Internet appliance, end station or any other computing device as described in FIG. 6. Stations 130A,B are wirelessly coupled to an access point. No pre-configuration or client is needed. The stations 130A,B operate according to wireless standards such as IEEE 802.11a, b, g, n, ac or any other wireless standard. The stations 130A,B send and/ or receive network packets as data for applications running on the mobile stations. Further, the stations 130A,B can be controlled more or less by the wireless network despite operating under standards that provide for station freedom over network control. Embodiments of the stations 130A,B are discussed in more detail below in association with FIG. 1D.

Figure 1B:
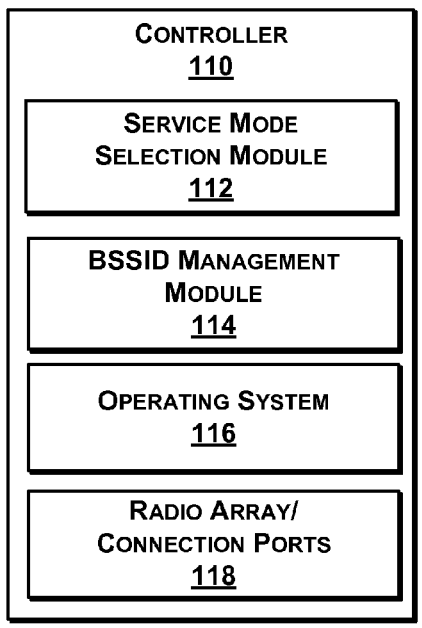
FIG. 1B is a more detailed block diagram illustrating a controller of the system of FIG. 1A, according to one embodiment.

FIG. 1B is a more detailed block diagram illustrating the controller 110 of the system 100 of FIG. 1A, according to one embodiment. The controller 110 includes a service mode selection module 112, a BSSID management module 114, an operating system 116 and a radio array/ connection ports 118. The components can be implemented in hardware, software, or a combination of both.

The service mode selection module 112 determines which of the service modes to implement for a station upon connecting to an access point 120. The service mode selection module 112 can receive identification information of the station from the access point 120, along with identification information (e.g., a MAC OIU, a MAC, or any other appropriate identifier). The identification information can reveal, for example, a prior connection history, a device type, and the like. These factors are used in selecting a corresponding service mode, depending on how a particular system is configured (see examples in FIG. 3). Additionally, the service mode selection module 112 can change a service mode responsive to a condition. For example, the station may be set to virtual cell service mode as a default, but is later switched to virtual port service mode because of network policy violations that can be more tightly managed under virtual port. The inverse is possible as well, i.e., reducing management control to save overhead (see examples in FIGS. 4 and 5).

The BSSID management module 114 assigns BSSIDs to particular access points 120 for communication with stations. The BSSID assignment can correspond to a service mode selected for a station. In the embodiment discussed herein, a general BSSID is assigned to a station in native cell service mode because no enhancements are needed. A persistent BSSID is assigned to a station in virtual cell service mode because the same BSSID is used as the station communicates with different access points. Finally, a per-station, unique BSSID is assigned to a station in the virtual port service mode because the control imposed by the controller 110 is customized for a specific station. Other embodiments can implement different types of BSSIDs.

The operating system 116 interfaces between the software and hardware of the controller 110. The operating system 124 can also include integrated applications. Further, the operating system 124 manages connections to access points 120 around a wireless network that are managed by the controller 110.

The radio array/ connection ports 118 represent physical access to communication channels or mediums. A radio array can include one or more transmit (Tx) and receive (Rx) antennas for communication with the physical layer. Some mobile stations 120 include separate antennae for IEEE 802.11a, IEEE 802.11b, IEEE 802.11n, and IEEE 802.11ac. Other mobile stations 110 include several antenna dedicated for separate transmit and receive paths using the MIMO functionality of IEEE 802.11ac. Antennae can be tuned for IEEE 802.11 transmissions. An Ethernet port can allow plug-in connections to a wired medium using a RJ-45 jack, or the like.

Figure 1C:
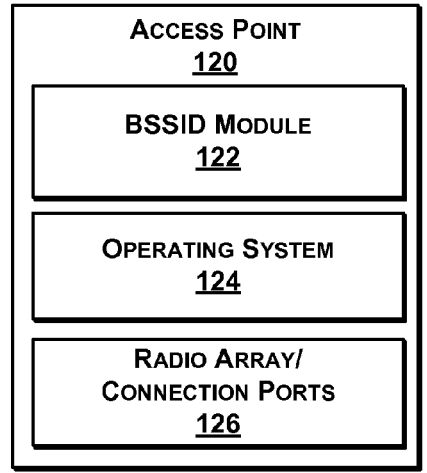
FIG. 1C is a more detailed block diagram illustrating an access point of the system of FIG. 1A, according to one embodiment.

FIG. 1C is a more detailed block diagram illustrating the access point 120 (generic reference to both access points 120A and 120B) of the system of FIG. 1A, according to one embodiment. The access point 120 comprises a BSSID module 122, an operating system 124, and a radio array/ connection ports 126. The components can be implemented in hardware, software, or a combination of both.

BSSID module 122 assigns BSSIDs to a particular station as directed by the controller 110. In one embodiment, the BSSID can be advertised by a beacon frame. There can be separate beacon frames for each BSSID in accordance with an IEEE 802.11 standard, or multiple BSSIDs can be sent in a modified format. When a station connects with the access point 120, a table can be updated to associate the station with a BSSID.

The operating system 124 interfaces between the software and hardware of the access point 120. The operating system 124 can also include integrated applications. The operating system 124 can handle connections to stations by sending out beacons.

The radio array/ connection ports 126 represent physical access to communication channels or mediums similar to the radio array/ connection ports 116 discussed above.

Figure 1D:
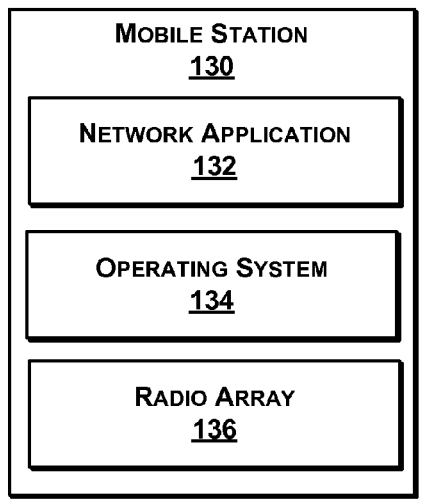
FIG. 1D is a more detailed block diagram illustrating a station of the system of FIG. 1A, according to one embodiment.

FIG. 1D is a more detailed block diagram illustrating a station 130 (generic reference to stations 130A, 130B through 130N) of the system of FIG. 1A, according to one embodiment. The mobile station 130 comprises a network application 132, an operating system 134, and a radio array 136. The components can be implemented in hardware, software, or a combination of both.

The network application 132 can be any application executing on the mobile station 130 that makes use of network access in operation. Examples of the network application 132 include a network browser, a VOIP telephone service, a streaming video player, a database viewer, a VPN client, and the like.

The operating system 134 is responsible for connecting to a communication channel for data exchange, among other tasks. To do so, the operating system 134 listens for beacons broadcast by access points, and generates a probe request to connect to a selected access point. After connecting, the operating system 134 exchanges data packs and unpacks data packets in accordance with, e.g., a TCP/IP stack. More particularly, IEEE 802.11-type packets (e.g., IEEE 802.11ac packets) can be generated and received.

The radio array 136 includes one or more transmit (Tx) and receive (Rx) antennas for communication with the physical layer, as described above in association with radio array/ connection ports 116 and 126.

Methods for Hybrid Services (FIGS. 2-5)

Figure 2:
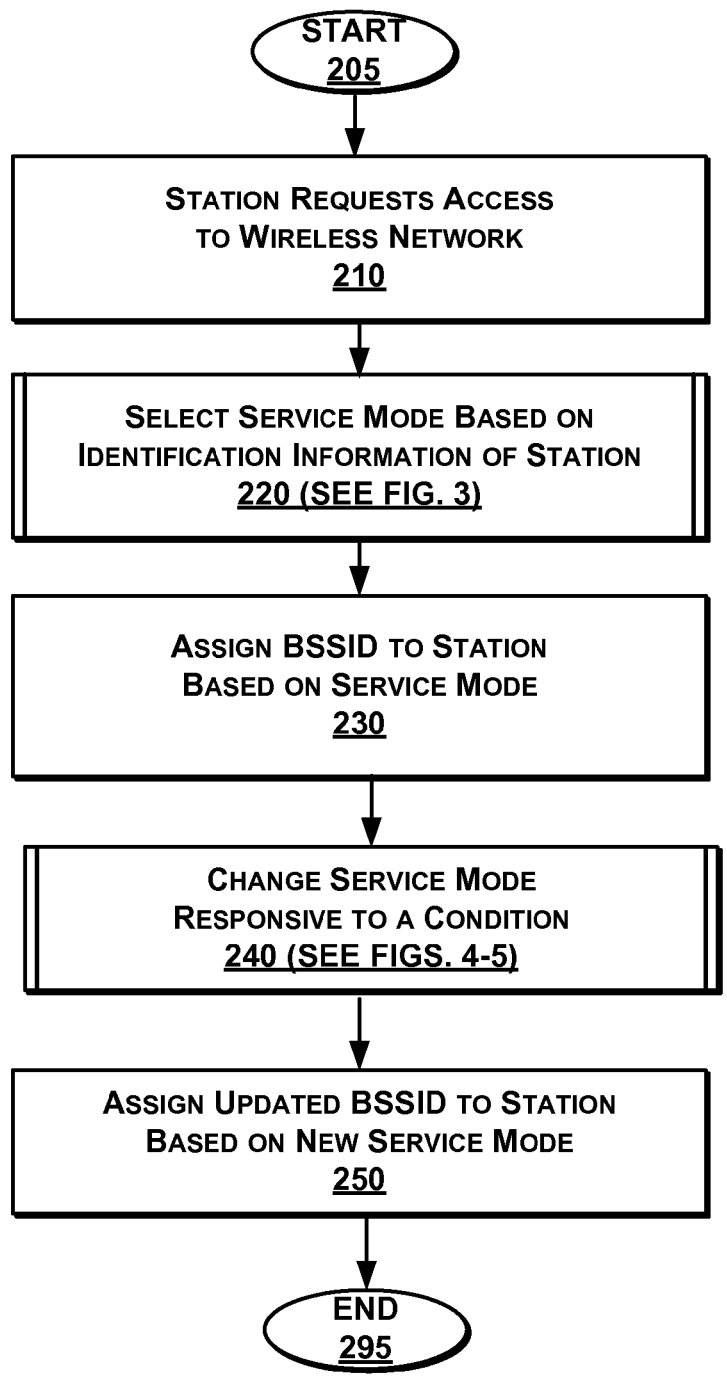
FIG. 2 is a high-level flow diagram illustrating a method for providing a hybrid of virtual port and virtual cell architectures to stations connected to a wireless network, according to one embodiment.

FIG. 2 is a high-level flow diagram illustrating a method for providing a hybrid of virtual port and virtual cell architectures to mobile stations connected to a wireless network, according to one embodiment. The method 200 can be implemented by, for example, a controller (e.g., controller 110 of FIG. 1).

At step 210, a station requests access to a wireless network. In one implementation, a station responds to beacon frames broadcast by an access point. Conventional access points transmit a typical BSSID in the beacon which is used by all connected stations to identify the access point. However, control by a centralized server that is connected to several access points can utilize virtual BSSIDs in order to provide virtual cell service mode or virtual port service mode. As described herein, the virtual cell service mode maintains a BSSID assigned by an initial connection to an access point across subsequent connections to other access points in a wireless network. Also, the virtual port mode provides a station with a unique BSSID to implement station-specific network controls.

At step 220, a service mode is selected based on identification information of the station. In one embodiment, a default service mode is virtual cell service mode because of a certain number of mobile stations and to reduce the resource overhead of virtual port service. In other embodiments, the default service mode can be virtual port or native cell modes. Exemplary decision logic is discussed below with respect to FIG. 3.

At step 230, a BSSID is assigned based on the selected service mode. In response to the connection request, an access point assigns either a general BSSID (e.g., in native cell mode), a persistent BSSID (e.g., in virtual cell mode) or a unique BSSID (e.g., in virtual port mode). The BSSID can be utilized by the station in conformance with IEEE 802.11-type standards. However, the access point and controller can utilize enhanced features within the same standards. In this case, consequentially, the station does not need modifications for compatibility.

At step 240, a service mode is changed responsive to a condition. In some implementation, a controller of a wireless network changes the service mode, although in other implementations, the service mode is not updated. To initiate the change, the connection with a station is terminated. Exemplary conditions are described further in connection with FIGS. 4 and 5. In one embodiment, a wireless network defaults a station connection to virtual cell. The default changes to either native cell or virtual port service modes (see FIG. 4). The native cell service mode changes from native cell to either virtual port or virtual cell service modes in (see FIG. 5). Alternatively, the virtual port service can be changed (not illustrated). In some embodiments, only one of step 220 service mode selection and step 240 service mode change, are implemented. Other embodiments are configured to implement both steps 220 and 240. The wireless system can also eliminate a service mode altogether, for example, by removing virtual port service mode for all stations.

At step 250, an updated BSSID is assigned to a station to complete the change. The BSSID is based on a new service mode compelled on the station by the controller. If changed to native cell service mode, a general BSSID can be assigned, if changed to virtual cell mode, a persistent BSSID can be assigned, and if changed to a virtual port mode, a station-unique BSSID can be assigned.

Figure 3:
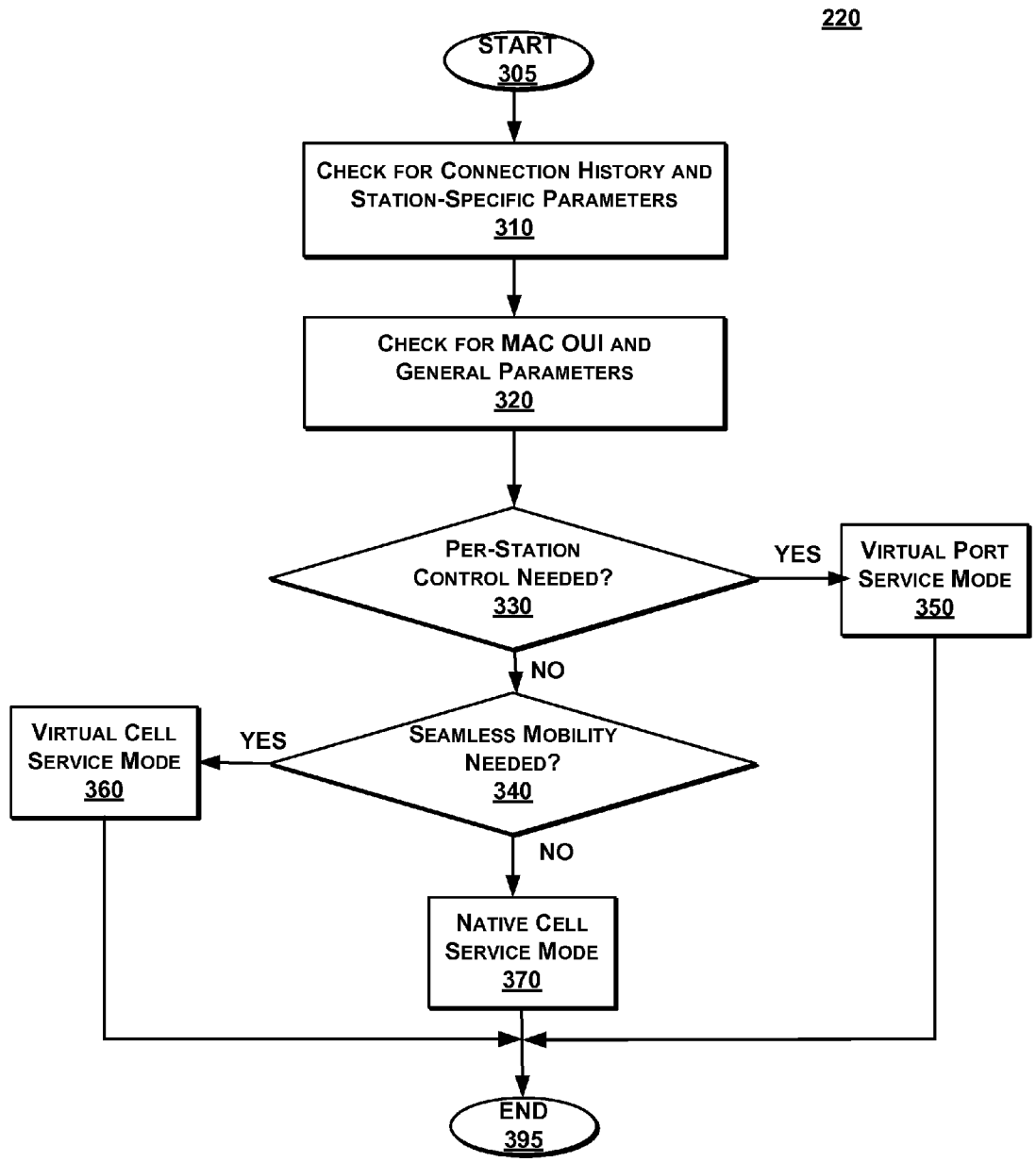
FIG. 3 is a more detailed flow diagram illustrating a step of selecting a service mode based on identification information of a station in the method of FIG. 2, according to one embodiment.

FIG. 3 is a more detailed flow diagram illustrating a method for providing a default mode network service in the method of FIG. 2, according to one embodiment.

At step 310, a connection history and station-specific parameters are checked. A station that has been previously granted enhanced services such as virtual cell service mode can reestablish the same level of service. The connection history may include other data leading a controller to require per-station control, or to grant seamless mobility service. As discussed, a station can have parameters that indicate incompatibility with virtual cell or virtual port service modes.

At step 320, a MAC OUI and general parameters are checked. The MAC OUI, or first three bytes of a MAC address can identify a manufacturer, distributor, type of device, or other information relative to throughput capacity or service mode compatibility (e.g., 00-0C-E6 corresponds to a Meru Networks Inc. device). The MAC OUI can be checked against an online or locally-stored database. The database correlates the MAC OUI to a specific device or type of device. In turn, the wireless network can configure a service mode for the device that optimizes network performance or security. For example, a low throughput device (e.g., a cellular telephone having 2G data service) can be assigned to a BSSID having lower or relaxed guarantees for bandwidth.

At step 330, if per station control is needed, a virtual port service mode is selected at step 350. Per station control may be granted to control uplink data rate or data quantity, quality of service, reconfiguration from one access point to a preferred access point (can be substantially invisible to the station), and the like. Per station control can be limited by resource availability due to the additional overhead needed for virtual port relative to virtual cell or native cell service modes.

At step 340, if seamless mobility is needed, a virtual cell service mode is selected at step 360. In one example, seamless mobility is granted due to resource availability. The processor loads at a controller and access point can be increased when virtual cell service mode is implemented due to additional overhead relative to native cell service mode. In another example, seamless mobility is granted as a default service mode. In still another example, seamless mobility is granted because the MAC OUI indicates a mobile device. Rights can also be manually granted by a system administrator.

Also at step 340, if seamless mobility is not needed, the station can continue operating under the native cell service mode at step 370. In one example, seamless mobility can be denied due to resource availability. Additionally, seamless mobility can be denied because the MAC OUI indicates a stationary device.

Figure 4:
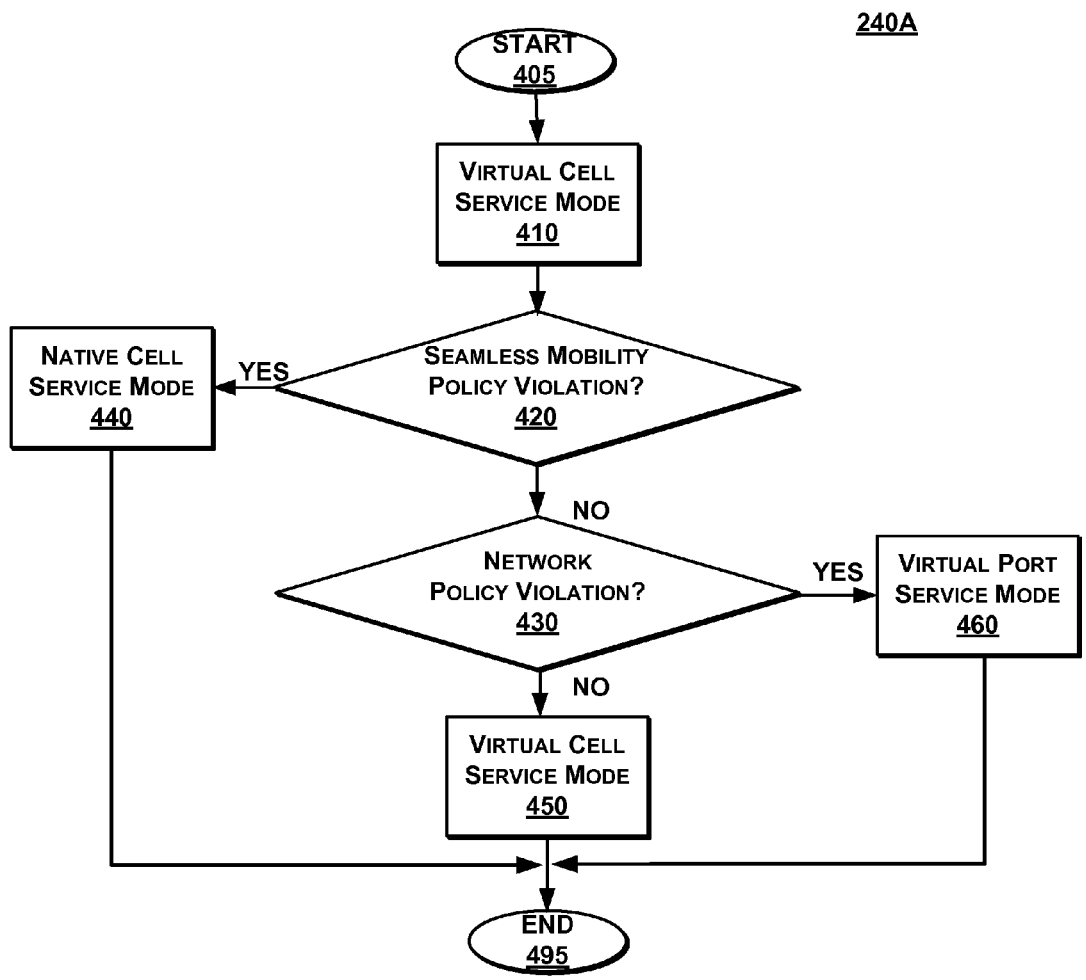
FIG. 4 is a more detailed flow diagram illustrating examples of changing the service mode from virtual cell service mode responsive to a condition in the method of FIG. 2, according to an embodiment.

FIG. 4 shows an example of the step 240 for changing the service mode in the method 200 of FIG. 2, according to an embodiment. In particular, a method 240A changes service modes in responsive to the condition of violating a policy. The method 240A can be a continuous loop for detection that occurs as long as a station is connected to a wireless network.

At step 410, a station operates in virtual cell service mode. The virtual cell service mode can be a default that is changed because of a policy violation. The station can change to either native cell or virtual port service modes.

At step 420, if a seamless mobility policy violation is detected, virtual cell changes to native cell service mode at step 440. The specific violation is for illustrative purposes only, as any type of appropriate condition can be configured for a particular system. One seamless mobility policy violation is detected when a mobile station is immobile for a certain amount of time. In this case, the wireless network can reduce overhead by changing to a native cell service mode that does not continually check for which access point that station is currently communicating with since it constantly communicates with a single access point. One way to test mobility is to compare flight times for packets over time. Mobility can also be gauged by a lack of communication with other access points in a wireless network (e.g., as determined by a controller in communication with each of the access points). Another violation is detected when exceptions of a certain quantity or type occur. One exception can be an incompatibility exception for a station despite having a MAC IOU that is compatible (e.g., an operating system or application incompatibility). Still another violation is detected when abuse of seamless mobility occurs by a station. The above are mere examples of possible violations that can vary based on specific needs.

At step 430, if a network policy violation is detected, virtual cell changes to virtual port service mode at step 460. Examples of network policy violations include uplink data rate or data quantity, security violations or vulnerabilities, unknown user or guest logged-in, and the like. As discussed above, the examples can vary based on specific needs. In general, the violation causes a switch to virtual port service mode so that a controller can have more management options. For example, the controller can limit uplink data rate or data quantity, or prevent a station considered as a security threat from connecting to certain access points or other network resources.

Also at step 430, if no violation has been detected, a station continues to operate in virtual cell service mode at step 450. In one embodiment, the virtual cell service mode continues until a violation is detected. Violation checks can be continuous, at predetermined intervals, or as needed.

Figure 5:
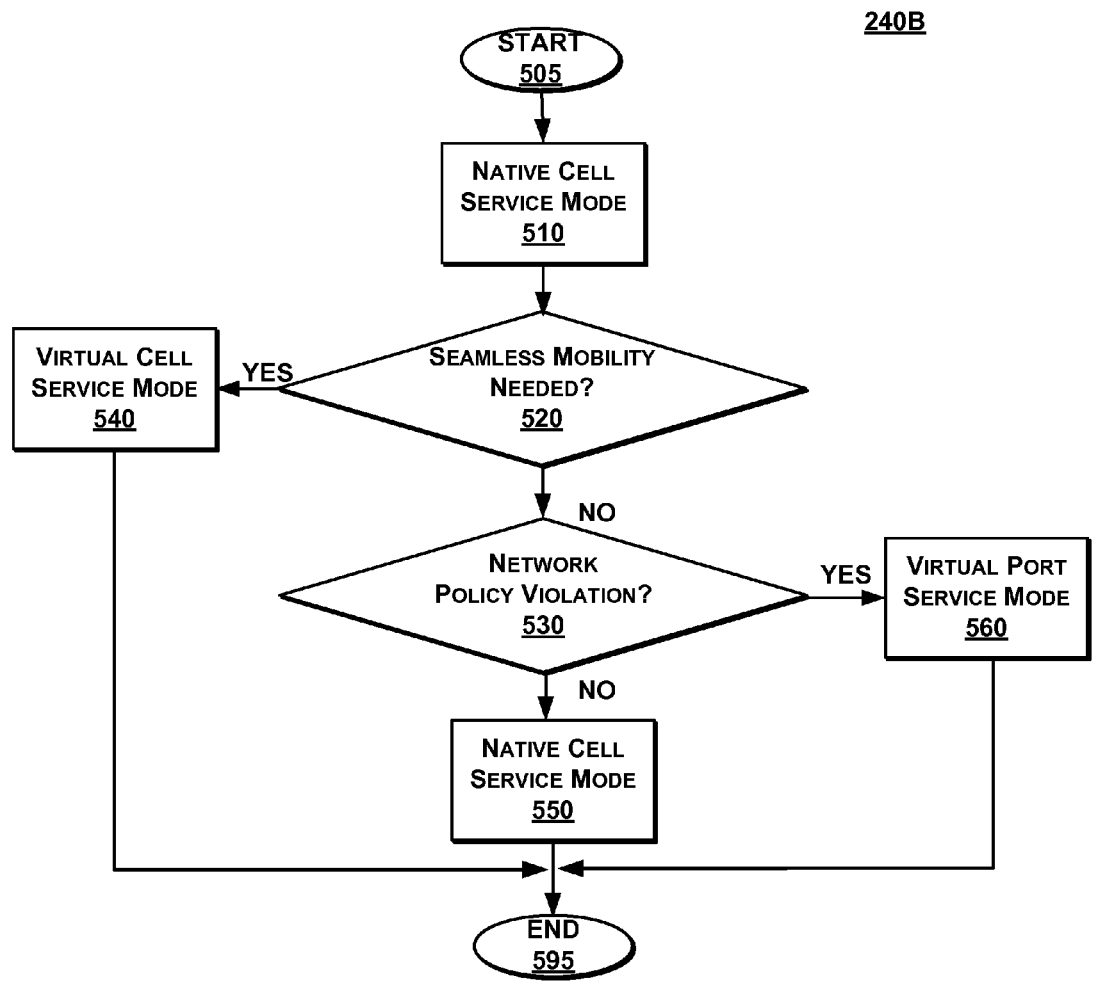
FIG. 5 is a more detailed flow diagram illustrating examples of changing the service mode from native cell service mode based on a condition, according to one embodiment.

FIG. 5 shows another example of the step 240 for changing the service mode in the method 200 of FIG. 2, according to an embodiment. In particular, a method 240B changes service modes in responsive to the condition of violating a policy. Relative to the method of 240A, the initial service mode is native cell rather than virtual cell. One or both of methods 240A and 240B can be implemented in a particular wireless network.

At step 510, a station operates in native cell service mode. The native cell service mode can be a default that is changed because of a policy violation. The station can change to either virtual cell or virtual port service modes.

At step 520, if seamless mobility service is needed, native cell changes to virtual cell service mode at step 540. Seamless mobility can be granted, for example, to a guest station that has gained the trust of the wireless network by avoiding policy violations for a predetermined amount of time. Alternatively, seamless mobility can be granted when a new user with higher credentials logs-on to the wireless network (e.g., a network administrator logs-in). Also, seamless mobility can be manually pre-configured by a network administrator. In still another example, traffic related to mobile applications or devices may be detected, and lead to a switch from native cell to virtual cell modes.

At step 530, if a network policy violation is detected, native cell changes to virtual port service mode at step 560. Examples of network policy violations include uplink data rate or data quantity, security violations or vulnerabilities, unknown user or guest logged-in, and the like.

Also at step 530, if no violation has been detected, a station continues to operate in native cell service mode at step 550. In one embodiment, the native cell service mode continues until a change is detected. Violation checks can be continuous, at predetermined intervals, or as needed.

Generic Computing Device (FIG. 6)

FIG. 6 is a block diagram illustrating an exemplary computing device 600 for use in the system 100 of FIG. 1A, according to one embodiment. The computing device 600 is an exemplary device that is implementable for each of the components of the system 100, including the access point 110, and the mobile stations 120A, B. Additionally, the computing device 600 is merely an example implementation itself, since the system 100 can also be fully or partially implemented with laptop computers, tablet computers, smart cell phones, Internet appliances, and the like.

The computing device 600, of the present embodiment, includes a memory 610, a processor 620, a hard drive 630, and an I/O port 640. Each of the components is coupled for electronic communication via a bus 699. Communication can be digital and/or analog, and use any suitable protocol.

The memory 610 further comprises network applications 612 and an operating system 614. The network applications 620 can include the modules of network applications or access points as illustrated in FIGS. 6 and 7. Other network applications can include 612 a web browser, a mobile application, an application that uses networking, a remote application executing locally, a network protocol application, a network management application, a network routing application, or the like.

The operating system 614 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 620 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method in a controller, for providing a hybrid of virtual port and virtual cell service modes to stations connected to a wireless network, comprising:

connecting to the wireless network comprising one or more access points;

receiving notification of a request for network access from a station to an access point of the plurality of access points, along with identification information associated with the station;

selecting a service mode to provide to the station based on the identification information, wherein the service modes comprise at least a native cell mode which assigns a BSSID (Basic Service Set IDentifier) for standard operation, a virtual cell mode which assigns a persistent BSSID as a station is serviced by different access points, and a virtual port mode which assigns a unique BSSID for a station; and assigning a BSSID to the station that corresponds to the service mode responsive to the notification.

2. The method of claim 1, further comprising:

changing the service mode responsive to at least one condition.

3. The method of claim 2, wherein changing the service mode comprises:

changing the service mode from virtual cell mode to virtual port mode responsive to the station violating a network policy.

4. The method of claim 2, wherein changing the service mode comprises:
changing the service mode from virtual cell mode to virtual port mode responsive to surpassing a threshold for at least one of an uplink data rate or an uplink data amount; and
controlling at least one of the uplink date rate or the uplink data amount over a wireless protocol without native support for control.

5. The method of claim 1, wherein the identification information comprises a MAC (Media Access Control) OUI (Organizational Unique Identifier) and wherein selecting the service mode comprises:
selecting the service mode to provide to the station is based on a MAC OUI.

6. The method of claim 5, wherein the MAC OUI is incompatible with the virtual cell mode.

7. The method of claim 5, wherein the MAC OUI indicates a type of station.

8. The method of claim 1, further comprising:
retrieving a connection history using the identification information,
wherein selecting the service mode comprises selecting the service mode based on the connection history.

9. The method of claim 1, wherein selecting the service mode comprises:
selecting the service mode at least partially based on available resources of the controller.

10. The method of claim 1, further comprising:
determining that the station is a non-mobile station; and
selecting the native cell mode or changing the service mode to the native cell mode.

11. The method of claim 1, wherein the controller manages a plurality of access points in the wireless network.

12. The method of claim 1, wherein the wireless network comprises an IEEE 802.11-type network.

13. A non-transitory computer-readable medium storing instructions that, when executed by a processor, perform a method in a controller, for providing a hybrid of virtual port and virtual cell service modes to stations connected to a wireless network, comprising:
connecting to the wireless network comprising one or more access points;
receiving notification of a request for network access from a station to an access point of the plurality of access points, along with identification information associated with the station;
selecting a service mode to provide to the station based on the identification information, wherein the service modes comprise at least a native cell mode which assigns a BSSID (Basic Service Set IDentifier) for standard operation, a virtual cell mode which assigns a persistent BSSID as a station is serviced by different access points, and a virtual port mode which assigns a unique BSSID for a station; and
assigning a BSSID to the station that corresponds to the service mode responsive to the notification.

14. A controller to provide a hybrid of virtual port and virtual cell service modes to stations connected to a wireless network, comprising:
an interface to connect to the wireless network and to receive notification of a request for network access from a station to an access point along with identification information associated with the station;
a selection module to select a service mode to provide to the station based on the identification information, wherein the service modes comprise at least a native cell mode which assigns a BSSID (Basic Service Set IDentifier) for standard operation, a virtual cell mode which assigns a persistent BSSID as a station is serviced by different access points, and a virtual port mode which assigns a unique BSSID for a station
a BSSID module to assign a BSSID to the station that corresponds to the service mode responsive to the notification.

* * * * *